United States Patent
Day (10) Patent No.: US 7,222,185 B1
(45) Date of Patent: May 22, 2007

(54) METHODS AND APPARATUS FOR DISTRIBUTING CONTENT WITHIN A CONTENT DELIVERY SYSTEM

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 595 days.

(21) Appl. No.: 10/263,963

(22) Filed: Oct. 3, 2002

(51) Int. Cl.
G06F 15/16 (2006.01)
H04J 3/26 (2006.01)

(52) U.S. Cl. .................. 709/232; 709/203; 709/213; 709/231; 709/244; 370/432

(58) Field of Classification Search .............. 709/203, 709/213, 231, 244, 232; 370/432
See application file for complete search history.

(56) References Cited

U.S. PATENT DOCUMENTS

| | | | |
|---|---|---|---|
| 5,892,535 A | 4/1999 | Allen et al. | |
| 5,901,327 A * | 5/1999 | Ofek | 710/5 |
| 6,115,379 A | 9/2000 | Flanders et al. | |
| 6,233,606 B1 * | 5/2001 | Dujari | 709/213 |
| 6,286,008 B1 * | 9/2001 | Matsumoto et al. | 707/102 |
| 6,295,380 B1 * | 9/2001 | Takahashi | 382/240 |
| 6,335,927 B1 | 1/2002 | Elliott et al. | |
| 6,446,130 B1 * | 9/2002 | Grapes | 709/231 |
| 6,577,599 B1 | 6/2003 | Gupta et al. | 370/236 |
| 6,580,756 B1 * | 6/2003 | Matsui et al. | 375/240.08 |
| 6,748,447 B1 * | 6/2004 | Basani et al. | 709/244 |
| 6,775,020 B2 * | 8/2004 | Fukunaga et al. | 358/1.15 |
| 6,886,029 B1 * | 4/2005 | Pecus et al. | 709/203 |
| 6,909,726 B1 | 6/2005 | Sheeran | 370/468 |
| 6,937,599 B1 * | 8/2005 | Yoshida et al. | 370/390 |
| 2001/0044851 A1 | 11/2001 | Rothman et al. | 709/231 |
| 2002/0069406 A1 | 6/2002 | Aaltonen et al. | |
| 2002/0129159 A1 | 9/2002 | Luby et al. | |
| 2002/0143975 A1 * | 10/2002 | Kimura et al. | 709/231 |
| 2002/0172368 A1 * | 11/2002 | Peterka | 380/278 |
| 2003/0103521 A1 * | 6/2003 | Raphaeli et al. | 370/445 |
| 2003/0231629 A1 * | 12/2003 | Banerjee et al. | 370/390 |
| 2003/0233540 A1 * | 12/2003 | Banerjee et al. | 713/153 |
| 2004/0042479 A1 * | 3/2004 | Epstein et al. | 370/432 |

* cited by examiner

Primary Examiner—Zarni Maung
Assistant Examiner—Saket Daftuar
(74) Attorney, Agent, or Firm—BainwoodHuang (57) ABSTRACT

A system controller selects a transmission mode for content distribution based upon the relative popularity of the content within the content distribution system. The system controller receives a content distribution request from a content source and detects a content distribution characteristic for content to be distributed by the content source, in response to receiving the content distribution request. When the content distribution characteristic indicates the content as being relatively popular, or frequently requested by receivers in the content distribution system, the system controller selects a one-to-many transmission mode for the content. When the content distribution characteristic indicates the content as being relatively unpopular, or infrequently requested by receivers in the content distribution system), the system controller selects a one-to-one transmission mode for the content. By selecting a transmission mode based upon the relative popularity of the content, the system controller maximizes network resources, thereby causing the network to operate economically.

19 Claims, 7 Drawing Sheets

METHODS AND APPARATUS FOR DISTRIBUTING CONTENT WITHIN A CONTENT DELIVERY SYSTEM

BACKGROUND OF THE INVENTION

In general, content distributors transmit audio, images, or text, (e.g., content) to end users or receivers using a variety of distribution models. Conventional models of distribution have particular cost components associated with the content transmission to a given audience.

One conventional mechanism or mode for content distribution involves broadcast transmission. In broadcast transmission, such as radio or satellite broadcast, a content source transmits content to many receivers (one-to-many). Typically, the facilities for broadcasting audio content are fairly large, complex, and capital intensive, even for low-power FM broadcasting. The total bandwidth available to a broadcaster using broadcast transmission is limited. Broadcast transmission, however, reaches all receivers equally such that adding an audience within a broadcast area does not create any additional costs for the broadcaster (e.g., the broadcaster does not have to develop additional broadcasting facilities). Therefore, broadcast distribution of content typically includes a low marginal cost (e.g., no additional cost with respect to reaching additional receivers in an audience) and an associated a high fixed cost (e.g., initial development of broadcast facilities).

Another conventional mechanism or mode for content distribution involves multicast transmission. In multicast transmission, such as IP multicast or application-level multicast, a content source transmits content to many receivers (e.g., one-to-many). Compared to broadcast transmission, multicast transmission is not limited by an allocated bandwidth and does not have the same high fixed cost associated with broadcast distribution of content. However, any given multicast consumes multicast addresses and router resources and, for multiple receivers, can load network resources.

Another conventional mechanism or mode for content distribution involves unicast transmission. In unicast transmission, such as digital streaming over a computer or information network (e.g., the Internet), a single content source transmits content to a single receiver. In general, unicast transmission is effective on a small scale because the associated transmission and reception tools, such as client computers, software, and network connection costs, have relatively low costs. The total bandwidth available to unicast transmission is virtually unlimited. The cost associated with unicast transmission, however, involves the addition of new listeners or receivers of content to the network. Adding listeners to a unicast or digital streaming media transmission requires additional streams of data (e.g., bandwidth), and corresponding additional costs and resources for installing and maintaining the additional streams. Therefore, unicast distribution of content involves a low fixed cost (e.g., cost of computers and connection) and an associated high marginal cost (adding content receivers to receive transmission).

Certain conventional networks, such as the Internet allow distribution of both broadcast or multicast transmissions (one-to-many) and unicast transmissions (one-to-one). For a user to receive content in either a one-to-many or a one-to-one transmission mode, the user must monitor the transmission mode of the incoming content. Furthermore, when informed of a transition between transmission modes, the user must, conventionally, manually select a receiver (e.g., computer program application) to receive content in a particular transmission mode (e.g., either one-to-one or one-to-many).

SUMMARY OF THE INVENTION

Conventional techniques for providing content to a user suffer from a variety of deficiencies.

As an example, the Internet allows the distribution of one-to-many (e.g., broadcast or multicast) transmissions and one-to-one (e.g., unicast) transmissions. In this arrangement, content having a relatively large audience or a large number of receiver can be transmitted using a one-to-one transmission mode while content having a relatively small audience or small number of receivers can be transmitted using a one-to-many transmission mode. As described above, a typical broadcaster experiences an associated a high fixed cost in developing broadcast facilities. Therefore, transmitting content in a one-to-many mode to a relatively small audience is not a cost effective use of the broadcast facilities. Also as described above, a unicaster experiences an increase in transmission costs to add listeners to a unicast transmission. Therefore, transmitting content in a one-to-one mode to a relatively large audience is, again, not a cost effective use of the unicast facilities.

In another example, as described above, the Internet provides for distribution of both one-to-many transmissions and one-to-one transmissions such that a user must select a receiver, or software application, to receive content in a particular transmission mode. Requiring the user to select between transmission modes implies that the user must monitor the transmission mode for content he wishes to receive in order to select the appropriate receiver. Such monitoring and selecting can be time consuming to the user. Furthermore, such monitoring and selecting by the user during the time that the user receives the content can be distracting. Requiring the user select between transmission modes can also cause the user to lose content when the transmission mode changes and the user does not know how to switch between reception modes or does not switch between reception modes in time.

By contrast, embodiments of the present invention significantly overcome such deficiencies and provide mechanisms and techniques for selecting a content distribution mode for content within a content distribution system. In one embodiment a system controller selects a transmission mode for content distribution based upon the relative popularity of the content within the content distribution system. When the system controller detects content as relatively popular (e.g., content frequently requested by receivers in the content distribution system), the system controller selects a one-to-many transmission mode for the content, such as broadcast or multicast transmission. When the system controller detects content as relatively unpopular (e.g., content infrequently requested by receivers in the content distribution system), the system controller selects a one-to-one transmission mode for the content, such as unicast transmission. By selecting a transmission mode based upon the relative popularity of the content, the system controller makes efficient use of network resources so as to neither under-utilize nor over-utilize the network, thereby causing the network to operate in an economic manner.

In one embodiment, the invention relates to a method for selecting a content distribution mode for content within a content distribution system. In the method, a system controller receives a content distribution request from a content source. In response to receiving the content distribution request, the system controller detects a content distribution characteristic for content to be distributed by the content source. The system controller then selects a transmission mode, from one of a first transmission mode and a second transmission mode, for distribution of the content within the content distribution system based upon the content distribution characteristic. The first transmission mode is a one-to-one transmission and the second transmission mode is a one-to-many transmission. By selecting a transmission mode based upon the content distribution characteristic related to the content, the system controller makes efficient use of network resources so as to neither under-utilize nor over-utilize the network, thereby causing the network to operate in an economic manner.

In another embodiment, the system controller transmits a transition marker to at least one receiver associated with the content distribution system. The transition marker indicates a switching of content distribution from a first transmission mode to a second transmission mode. By transmitting a transition marker to a receiver, the system controller allows the receiver to automatically switch from receiving a first transmission mode transmission to receiving a second transmission mode transmission, thereby minimizing the user's time in monitoring the transmission mode for particular content.

In another embodiment, the system controller transmits a synchronization marker to the at least one receiver, the synchronization marker indicating, to the at least one receiver, at least one transition point between the content distributed using the first transmission mode and the content distributed using the second transmission mode. The synchronization marker allows a continuous transition between content received by the first transmission mode to content received by the second transmission mode. The synchronization marker minimizes creation of a switching artifact or discontinuities in the received content as delivered to an end user.

In another embodiment, when detecting, the system controller receives a content reception characteristic related to the content distributed in the content distribution system where the content reception characteristic indicating reception of the content by at least one content receiver. The system controller then compares the content reception characteristic with a threshold condition. Based upon a result of the comparison of the content reception characteristic and the threshold condition, the system controller selects a transmission mode for the content. The reception characteristic relates to the popularity of a particular type of content. By comparing the reception characteristic with the threshold value, the system controller detects the relative popularity of the content and, therefore, the proper transmission mode for the content.

In another embodiment, the system controller directs at least one content source associated with the content distribution system to transmit the content using the selected transmission mode for the content. By directing a content provider to provide content in either a first transmission mode or a second transmission mode, the system controller makes an economic based decision for using network resources.

In another embodiment, for a plurality of content sources associated with a content distribution system, the invention relates to a method for selecting a system controller for the content distribution system. In the method, the plurality of content sources detects an identifier characteristic associated with each of the plurality of content sources. The plurality of content sources selects one content source from the plurality of content as the system controller within the content distribution system based upon the identifier characteristic. This method provides a fault tolerance to the content distribution system in the event of a system controller failure.

In another embodiment, for a receiver associated with a content distribution system, the invention relates to a method for selecting a reception channel for receiving content. In the method, the receiver receives content transmitted in a first transmission mode over a first reception channel, the first transmission mode being a one-to-one transmission. The receiver receives a transition marker indicating a change in content distribution from the first transmission mode to a second transmission mode, the second transmission mode being a one-to-many transmission. The receiver then switches from the first reception channel to a second reception channel, the second reception channel configured to receive content transmitted in the second transmission mode based upon reception of the transition marker. The receiver then receives content transmitted in the second transmission mode over the second reception channel. By the receiver automatically switching from receiving content transmitted in a first transmission mode through a first reception channel to receiving content transmitted in a second transmission mode through a second reception channel, the receiver frees a user's time in having to manually switch a receiver to receive one of two transmission modes.

The embodiment described above relates to a method for selecting a reception channel for receiving content based upon the transmission method. As described the receiver switches from a first reception channel receiving content transmitted by a one-to-one transmission to a second reception channel receiving content transmitted by a one-to-many transmission. However, in another embodiment, the receiver also switches from the second reception channel for receiving content transmitted by a one-to-many transmission to the first reception channel for receiving content transmitted by a one-to-one transmission.

Other embodiments of the invention include a computer system, such as a system controller, computerized device, or other device configured with software and/or circuitry to process and perform all of the method operations noted above and disclosed herein as embodiments of the invention. In such embodiments, the device, such as a system controller comprises at least one communications interface (e.g., a network interface), a controller having a memory (e.g., any type of computer readable medium, storage or memory system) and a processor, and an interconnection mechanism connecting the communications interface, the processor and the memory. In such embodiments, the memory system is encoded with a content distribution application that when performed on the processor, produces a content distribution process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a content distribution application, such as a system controller operating system configured with a content distribution manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a system controller apparatus. It is to be understood that the system of the invention can be embodied strictly as a software program, as software and hardware, or as hardware and/or circuitry alone. The features of the invention, as explained herein, may be employed in system controllers and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

A system controller selects a transmission mode for content distribution based upon the relative popularity of the content within the content distribution system. When the system controller detects content as relatively popular (e.g., content frequently requested by receivers in the content distribution system), the system controller selects a one-to-many transmission mode for the content, such as broadcast or multicast transmission. When the system controller detects content as relatively unpopular (e.g., content infrequently requested by receivers in the content distribution system), the system controller selects a one-to-one transmission mode for the content, such as unicast transmission. By selecting a transmission mode based upon the relative popularity of the content, the system controller makes efficient use of network resources so as to neither under-utilize nor over-utilize the network, thereby causing the network to operate in an economic manner.

Figure 1:
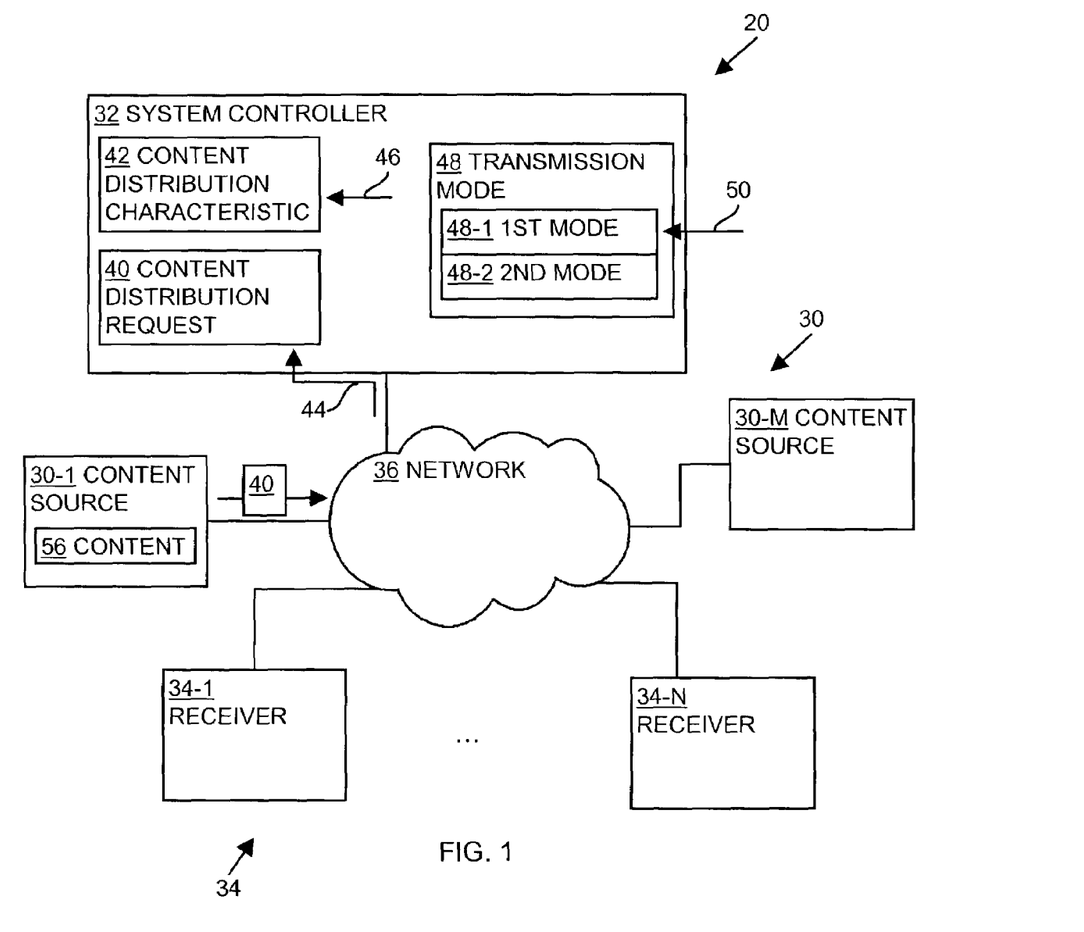
FIG. 1 is a block diagram of a content distribution system, configured according to one embodiment of the invention.

FIG. 1 illustrates a content distribution system 20, according to one embodiment of the invention. The content distribution system 20 includes a system controller 32, at least one content source 30, and at least one receiver 34. As illustrated, the content distribution system 20 includes a plurality of content sources 30-1, 30-M, a plurality of receivers 34-1, 34-N and a single system controller 32. A network 36 interconnects the system controller 32, each content source 30, and each receiver 34 within the content distribution system 20 and allows for distribution of content 56 within the content distribution system 20.

The system controller 32 is a computerized device configured to select a transmission mode for distribution of content 56 within the content distribution system 20. In one embodiment, the content source 30 is a computerized device configured to distribute content (e.g., streaming content 56) to one or more receivers 34-1, 34-N in a transmission mode 48 as determined by the system controller 32. In another embodiment, the receiver 34 is also a computerized device configured to receive content 56, as distributed through the content distribution system 20, in the transmission mode 48 determined by the system controller 32.

The network 36 transmits content as both one-to-one and one-to-many transmissions. A one-to-one transmission is a content transmission from a single sender to a single receiver, such as a unicast transmission. A one-to-many transmission is a content transmission from a single sender to multiple receivers, such as a multicast or broadcast transmission. In one embodiment, the network 36 is the Internet or is a local area network (LAN) and provides both unicast transmissions (one-to-one transmissions) and multicast transmissions (one-to-many transmissions). In another embodiment, the network 36 is a logical network formed of an Internet or LAN network for unicast transmissions (one-to-one transmissions) and a broadcast network, such as a radio broadcast network, for broadcast transmission (one-to-many transmissions) of content.

Figure 2:
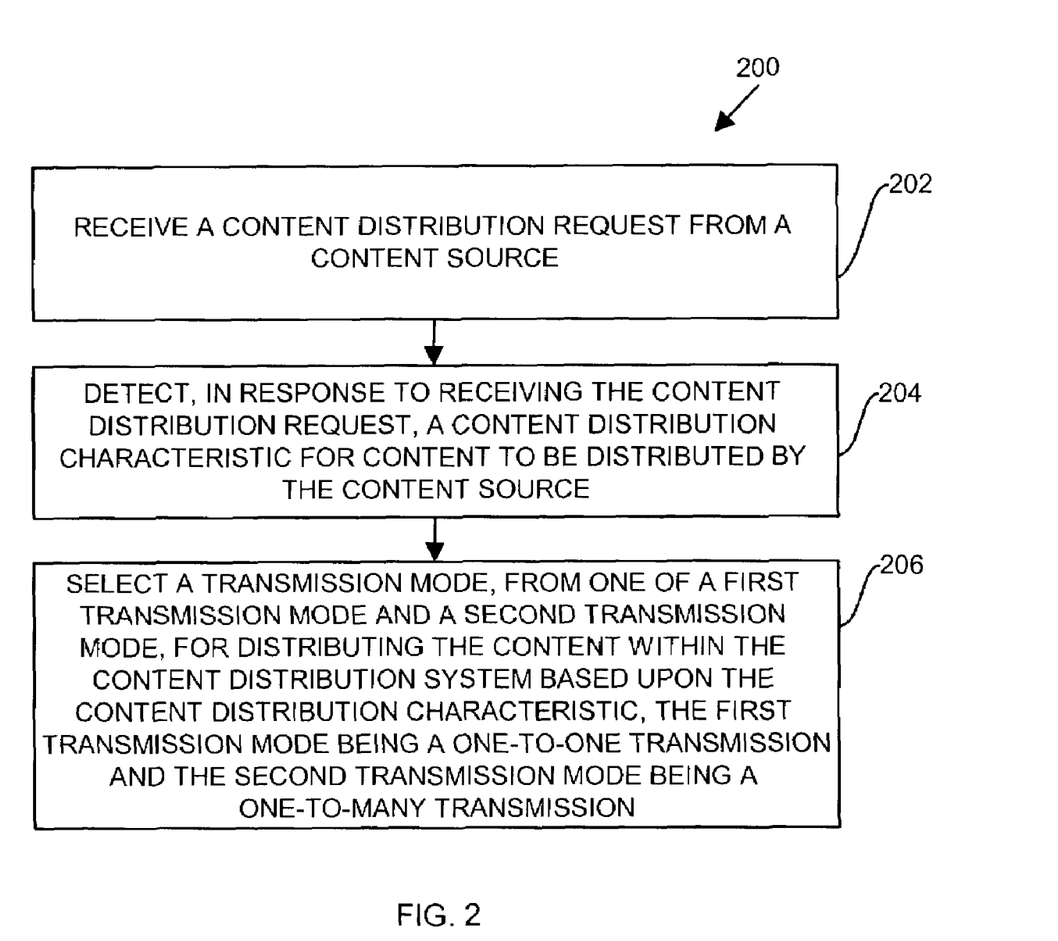
FIG. 2 is a flowchart of a procedure performed by the system controller of FIG. 1, configured according to one embodiment of the invention.

FIG. 2 illustrates a flowchart showing a method 200 performed by the system controller 32 of the content distribution system 20, according to one embodiment of the invention. In the method 200, the system controller 32 selects a content transmission mode 48 for content 56 within the content distribution system 20 based upon a content distribution characteristic 42 (e.g., indicating content popularity) associated with the content 56. The system controller 32 aids in maximizing the economic use of network resources within the content distribution system 20.

In step 202, the system controller 32 receives 44 a content distribution request 40 from the content source 30-1. For example, in FIG. 1, the content source 30-1 transmits a content distribution request 40 to the system controller 32. The content distribution request 40 includes, in one embodiment, a notification as to the type of content 56 to be distributed by the content source 30-1. For example, the content distribution request 40 can include a request 40 for distribution of music within the content distribution system 20 where the notification indicates that the music is jazz music.

In step 204, the system controller 32 detects 46, in response to receiving 44 the content distribution request 40, a content distribution characteristic 42 for content 56 to be distributed by the content source 30-1. In one embodiment, the content distribution characteristic 42 relates to the popularity of the content 56 (e.g., the number of receivers 34 that request or receive a particular type of content 56) to be distributed throughout the content distribution system 20.

In step 206, the system controller 32 selects 50 a transmission mode 48, from one of a first transmission mode 48-1 and a second transmission mode 48-2, for distribution of the content 56 within the content distribution system 20 based upon the content distribution characteristic 42. By way of example, the first transmission mode 48-1 is a one-to-one transmission (e.g. unicast transmission) and the second transmission mode 48-2 is a one-to-many transmission (e.g., broadcast or multicast transmission). As described the content distribution characteristic 42 relates to the popularity of content 56 within the content distribution system 20.

By selecting a transmission mode 48 for the content 56, the system controller 32 makes efficient use of the network resources within the system 20. For example, in the case where the system controller 32 detects the content 56 as relatively popular content 56 (e.g., large number of requests or receivers), the system controller 32 selects the transmission mode 48 as the second transmission mode 48-2 (e.g., a one-to-many or broadcast transmission mode) for the content 56. In the case where the system controller 32 detects the content 56 as relatively unpopular content 56 (e.g., small number of requests or receivers), the system controller 32 selects the transmission mode 48 as the first transmission mode 48-1 (e.g., a one-to-one transmission mode) for the content 56.

As described above, assume a broadcaster experiences a high fixed cost in developing broadcast facilities. Therefore, transmitting content 56 in a broadcast transmission mode 48-2 to a relatively small number of receivers is not a cost effective use of the broadcast facilities. Also as described above, assume that a unicaster experiences an increase in transmission costs to add listeners to a unicast transmission. Therefore, transmitting content 56 in a one-to-one transmission mode 48-1 to a relatively large audience is, again, not a cost effective use of the unicast facilities. By directing the distribution of the more popular content 56 using one-to-many transmission 48-2, the system controller 32 distributes content 56 to a relatively large audience in an economical manner, i.e., at no additional cost per added receiver 34. By directing the distribution of the less popular content 56 using one-to-one transmission 48-1, the system controller 32 also distributes content in an economical manner, i.e., does not consume one of only a few available channels or does not flood the network with unnecessary packets. The system controller 32, therefore, manages the resources in the network 36 by matching an appropriate transmission mode 48 of content 56 based upon the popularity of the content 56.

As described, the system controller 32 detects the content distribution characteristic 42 related to the content 56 to be distributed by the content source 30. In one embodiment, the system controller 32 receives information related to the content distribution characteristic 42 from an external source. In one embodiment, the content distribution system 20 includes a feedback mechanism between the system controller 32 and the receiver 34 that transmits information affecting the content distribution characteristic 42 for a particular type of content 56.

Figure 3:
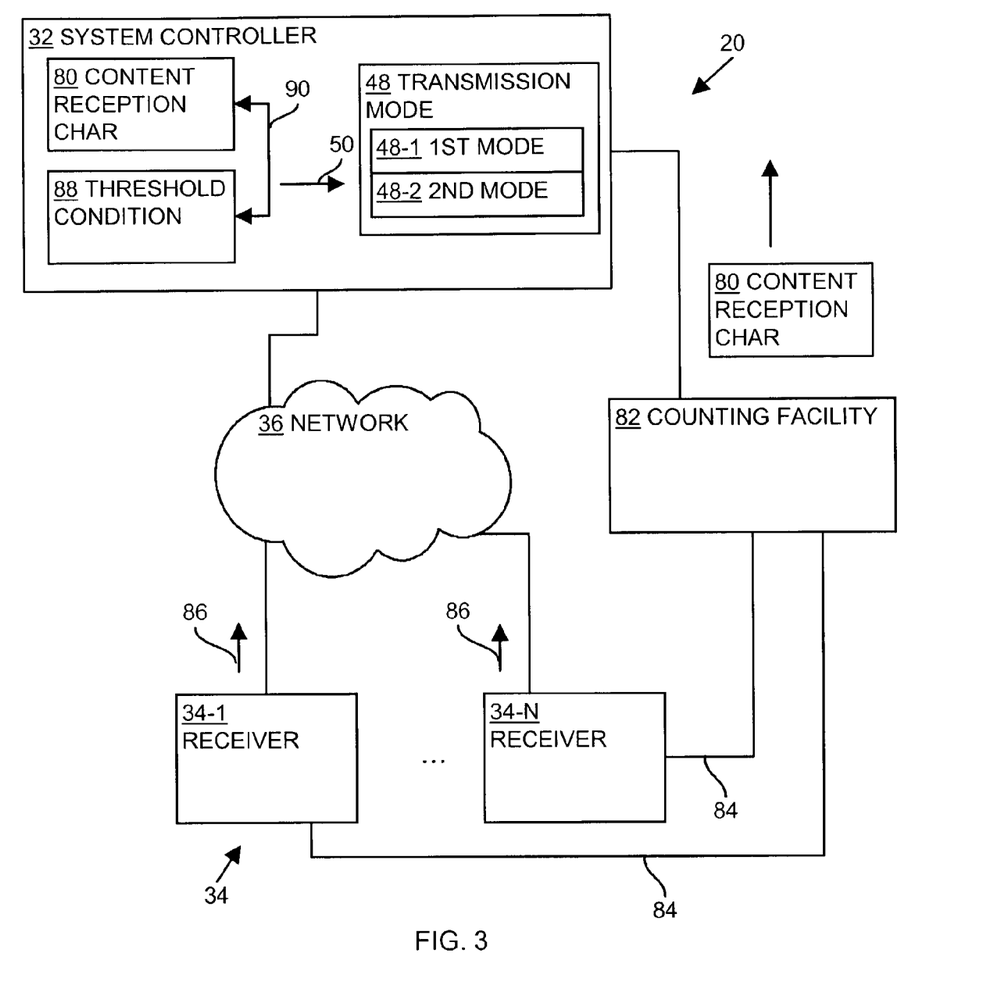
FIG. 3 is a block diagram of a content distribution system, configured according to another embodiment of the invention.

In one embodiment, as illustrated in FIG. 3, when the system controller 32 detects a content distribution characteristic 42 for content 56 to be distributed by the content source 30, the system controller 32 first receives a content reception characteristic 80 related to the content 56 distributed in the content distribution system 20, the content reception characteristic 80 indicating reception of the content 56 by at least one content receiver 34. For example, the content distribution system 20 includes a counting facility 82 located between the system controller 32 and the receivers 34-1, 34-N. In this embodiment, the receivers 34-1, 34-N, when engaged with the content distribution system 20, each maintain a control connection 84 with the counting facility 88.

As the receivers 34-1, 34-N request 86 content 56 from within the content distribution system 20, the counting facility 88 detects or tracks, over a period of time, the type of content 56 requested or received by the receivers 34-1, 34-N. For each type of content 56 (e.g., jazz music, rock music, video files) requested or received, in one embodiment, the counting facility 88 pools the content requests 86 for the receivers 34-1, 34-N and ranks the popularity of particular types of content 56 based upon the number of requests 86 each type of content 56 received. In another embodiment, the counting facility 88 detects or tracks the type of content 56 requested or received by the receivers 34-1, 34-N at a given time (e.g., once every minute, once every five minutes) and, based upon the number of requests at that time, maps the popularity of particular types of content 56 directly to a particular content item 56. The counting facility then reports the results (e.g., relative popularity of the content 56) to the system controller 32 as a content reception characteristic 80.

The system controller 32 then compares 90 the content reception characteristic 80 with a threshold condition 88. The threshold condition 88, in one embodiment, is a limit for an acceptable level popularity of a particular type of content 56. For example, assume that the threshold limit 88 between popular content 56 and unpopular content 56 is a limit 88 of 50 requests per day. Assume, in a content distribution system 20, receivers 34-1, 34-N request jazz content 56 at a rate of 20 requests per day. The system controller 32, in this example, compares the content reception characteristic 80 of the jazz content 56 (e.g., 20 requests per day) with the threshold condition 88 (e.g. 50 requests per day). In this example, the system controller 32 detects that the content reception characteristic 80 of the jazz content is below the threshold value 88 and therefore that the jazz content 56 is a relatively unpopular content 56 within the system 20.

Based upon the results of the comparison 90 of the content reception characteristic 80 and the threshold condition 88, the system controller 32 selects 50 the transmission mode 48 for the content 56. In the example described, because the content reception characteristic 80 falls below the threshold level 88, the system controller 32 distributes the jazz content 56 within the content distribution system 20 using the one-to-one transmission mode 48-1 (e.g. unicast transmission).

In order for the content source 30 to transmit content 56 or the receiver 34 to receive content 56 according to a particular transmission mode 48, each must be notified of the selected transmission mode 48. Therefore, after selecting a transmission mode 48 for a particular type of content 56, the system controller 32 notifies the content source 30 and the receiver 34 associated with the system 20 of the selected transmission mode 48. In one embodiment, the system controller 32 transmits, using a one-to-many (e.g., broadcast or multicast) transmission mode, an allocation map 300 to the content sources 30-1, 30-N and receivers 34-1, 34-N associated with the content distribution system 20.

Figure 4:
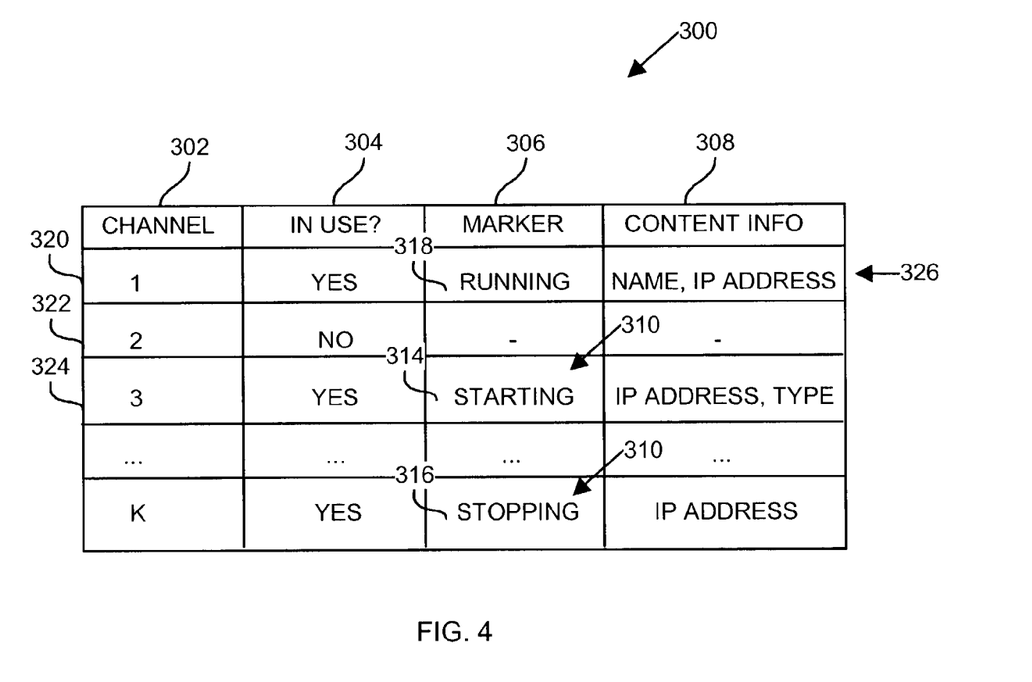
FIG. 4 is an allocation table used by the content distribution system of FIG. 1, according to one embodiment of the invention.

FIG. 4 illustrates an allocation table 300 used by the system controller 32 to notify content sources 30 and receivers 34 associated with the content distribution system 20 of the transmission mode 48 for particular types of content 56. In one embodiment, the system controller 32 includes entries within the allocation table 300 relating to transmission of content 56 according to a single transmission mode 48, either the one-to-one transmission mode 48-1 or the one-to-many transmission mode 48-2.

In one embodiment, the system controller 32 includes entries within the allocation table 300 that relate to content 56 transmitted through the system 20 using the one-to-many transmission mode 48-2. When the system controller 32 does not include an entry 326 within the allocation table 300 for a particular type of content 56, the absence of an entry 326 indicates transmission of the content 56 within the content distribution system 20 using the one-to-one transmission mode 48-1. Therefore, when a receiver 34 receives the allocation table 300, the receiver 34 detects the transmission mode 48 for a particular type of content 56 based upon the presence or absence of an entry 326 within the allocation table 300 for that type of content 56.

For example, if the receiver 34 requests jazz content 56 and receives an allocation table 300 and does not contain an entry 326 for jazz content 56, the receiver 34 determines that it cannot receive jazz content 56 transmitted according to the one-to-many transmission mode 48-2. The receiver, in turn, can attempt to receive the jazz content 56 by directly contacting the content sources 30-1, 30-M and receiving the content 56 in the one-to-one transmission mode 48-1.

As shown in FIG. 4, the allocation map 300 includes a channel field 302, a use field 304, a marker field 306, and an information field 308. The content source 30 and the receiver 34 use the information associated with each field 302,304,306, and 308 when either transmitting or receiving content 56, respectively, of a particular transmission mode 48.

The channel field 302 indicates the number of channels available for distribution of content 56 within the content distribution system 20. A channel can correspond to a frequency/bandwidth allocation for broadcast transmission, a multicast address for IP multicast transmission, for example. As shown in FIG. 4, the content distribution system 20 includes channels 1 through K for distribution of content 56. In one embodiment, each channel (e.g., channels 1 through K) distributes a particular type of content 56. For example, channel one 320 can distribute classical music content 56, channel two 322 can distribute jazz music content 56, and channel three 324 can distribute rock music content 56.

The use field 304 indicates the operation state of a particular channel in the channel field 302. In one embodiment, prior to assigning content for distribution over a particular channel, the system controller 32 examines the use field 304 of the allocation table 300 to detect the presence of an open or unused channel within the content distribution system 20. For example, when a content source 30 transmits a content distribution request 40 to the system controller 32, the system controller 32 reviews the allocation table 300 to determine or detect the presence of an unused channel within the content distribution system 20. The system controller 32 can then add information relating to the content 56 to the allocation table 300 to an open or unused channel within the allocation table 300. In one embodiment, the information indicates the requesting content source 30 as the distributor of a particular type of content 56, as will be described below.

The marker field 306 indicates to a receiver 34 associated with the content delivery system 20 the status of the content delivery to the receiver 34. For example, the marker field 306 includes a starting value 314, stopping value 316, and a running value 318. The starting marker 314 and the stopping marker 316 are transition markers 310. The transition markers 310 indicate to the receiver 34 a change in the transmission mode 48 for particular type of content 48 such as the transmission mode 48 switching of content distribution from the first transmission mode 48-1 (e.g., one-to-one) to the second transmission mode 48-2 (e.g., one-to-many).

In one embodiment, when the marker field 306 includes a starting marker 314 associated with a channel, the starting marker 314 indicates, to the receiver 34, that the content 56 received by the receiver in the first transmission mode 48-1 (e.g. one-to-one transmission) will terminate in a relatively short period of time. The starting marker further indicates to the receiver 34 that, in order to continue receiving the content 56, the receiver 34 must switch to receiving the content 56 transmitted by the second transmission mode 48-2 (e.g. one-to-many transmission).

In another embodiment, when the marker field 306 includes a stopping marker 316 associated with a channel, stopping marker 316 indicates to the receiver 34 that the content 56 received by the receiver in the second transmission mode 48-2 (e.g. one-to-many transmission) will terminate in a relatively short period of time. The stopping marker 316 further indicates that the receiver 34 must switch to receiving the content 56 according to the first transmission mode 48-1 (e.g. one-to-one transmission).

When the marker field includes a running marker 318, the running marker 318 indicates, to the receiver 34, distribution of content 56 in the second transmission mode 48-2 (e.g. one-to-many transmission) over a particular channel. As described above, in one embodiment, if the system controller 32 inserts an entry 326 into the allocation table for a particular type of content 56, that content 56 is distributed within the content distribution system 20 using the one-to-many transmission mode 48-2. Therefore, when the receiver 34 detects a running marker 318, because of the presence of an entry 326 in the allocation table 300 related to a type of content 56, the receiver 34 determines that the content 56 in the allocation table 300 can be received in a one-to-many transmission mode 48-2.

The content information field 308 provides information relating to the content 56 distributed within the content distribution system 20. For example, the content information field 38 includes information relating to the name of a piece of content 56, the type of content 56 distributed on a particular channel (e.g. jazz content), source information indicating the source 30 of the content 56 (e.g., the Internet protocol IP address of the content source 30 or system controller 32), and the stopping time for transmission of the content 56.

Figure 5:
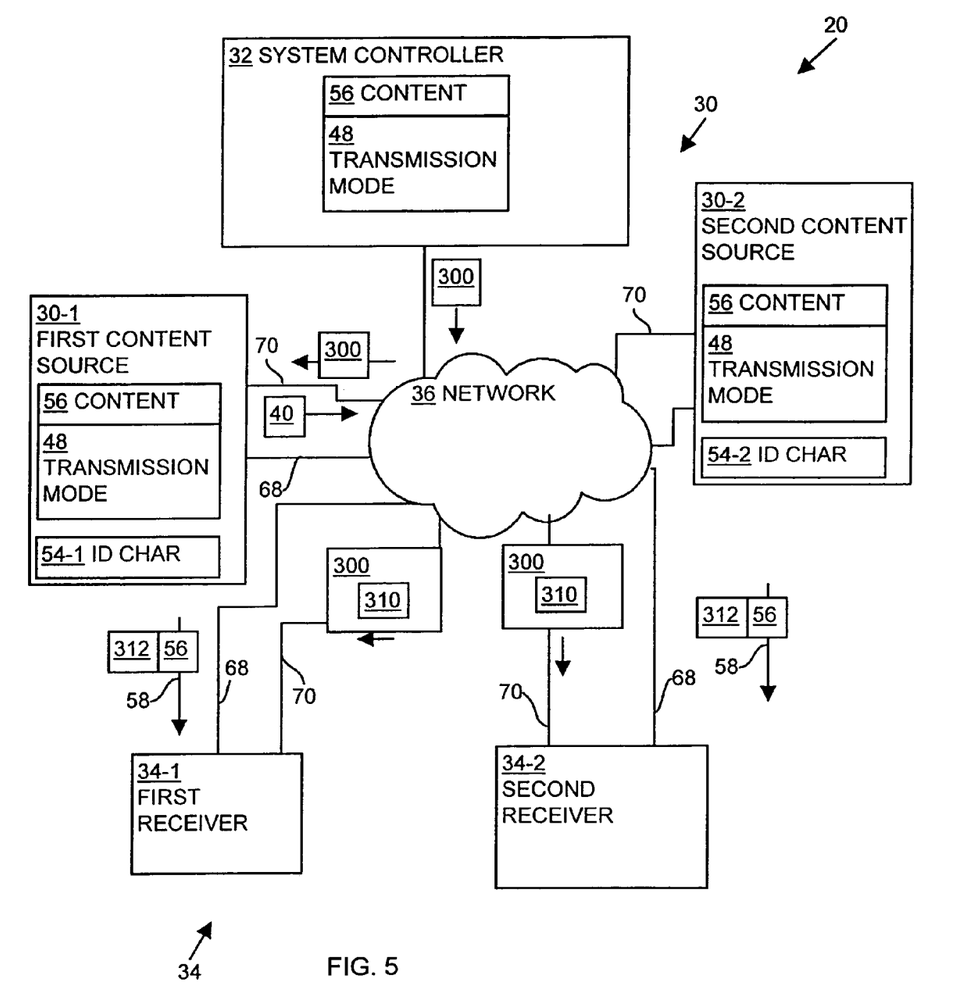
FIG. 5 is a block diagram of a content distribution system, configured according to one embodiment of the invention.

As described, the content source 30 and the receiver 34 use the allocation table 300 and the information associated with each field 302,304,306, and 308 of the allocation table 300 when either transmitting or receiving content 56, respectively, in a particular transmission mode 48. FIG. 5 shows an embodiment of the content distribution system 20 using the allocation table 300 and the information associated with the allocation table 300.

FIG. 5 illustrates a content distribution system 20, according to another embodiment of the invention. The content distribution system 20 includes a system controller 32, a first content source 30-1, a second content source 30-2, a first receiver 34-1, a second receiver 34-2, and a network 36 interconnecting the system controller 32, content sources 30, and receiver 34.

During operation of the system 20 the system controller 32 transmits the allocation table 300 to all of the receivers 34-1, 34-2 associated with the content distribution system 20. The content distribution system 20 includes a content delivery channel 68 and an allocation table channel 70. In one embodiment, the receivers 34-1, 34-2 receive the allocation table 300 from the system controller 32 over the allocation table channel 70 associated with each receiver 34-1, 34-2. In another embodiment, the receivers 34-1, 34-2 receive content 56 over the content delivery channel 68.

As the receivers 34-1, 34-2 receive the allocation table 300 from the system controller 32, the receivers 34-1, 34-2 determine whether or not particular type of content 56 is distributed within the system 20 in either a one-to-many transmission mode 48-2 or a one-to-one transmission mode 48-1. If the receivers 34-1, 34-2 detect an entry 326 for a particular type of content 56 within the allocation table 300, the receivers 34-1, 34-2 receive the content 56 through the one-to-many transmission mode 48-2 (e.g., the receivers 34-1, 34-2 become broadcast transmission receivers). If the receivers 34-1, 34-2 do not detect an entry 326 for a particular type of content 56 within the allocation table 300, the receivers 34-1, 34-2 receive the content 56 through a one-to-one transmission mode 48-1 (e.g. the receivers 34-1, 34-2 become unicast receivers).

In certain situations, the system controller 32 reallocates the transmission of content 56 from one transmission mode to another transition mode (e.g., first transmission mode 48-1 to second transmission mode 48-2) based upon the content distribution characteristic 42, as described above. When the system controller 32 changes the transmission mode 48 for a particular type of content 56, the system controller 32 transmits, as part of the allocation table 300, a transition marker 310 to the receivers 34-1, 34-2. The transition marker 310, in one embodiment, acts as trigger that causes the receivers 34-1, 34-2 to switch from receiving content 56 in one transmission mode 48 to receiving content 56 in another transmission mode 48.

For example, when the system controller 32 reallocates the transmission mode 48 of content 56 from a one-to-many transmission mode 48-2 to a one-to-one transmission mode 48-1, the system controller 32 uses the allocation table 300 and transmits, as a trigger marker 310, a stopping value 316 to the receiver 34. As described above, the stopping value 316 indicates to the receivers 34-1, 34-2 that the content 56 transmitted in broadcast mode 48-2 is changing or switching, after passage of a time interval, to transmission in a one-to-one mode 48-1. During the time interval, the receiver 34 changes or switches its reception function such that the receiver 34 receives one-to-one (e.g., unicast) transmissions rather than one-to-many (e.g., broadcast or multicast) transmissions. After the system controller 32 switches the transmission status of the content 56 from a one-to-many transmission mode 48-2 to a one-to-one transmission mode 48-1, the system controller 32 removes the entry 326 for the content 56 from the allocation table 300. Such removal allows system controller 32 to use, at a later time, the channel associated with removed content 56 for distribution of other content in the content distribution system 20.

In another embodiment, when the system controller 32 reallocates the transmission mode 48 of content 56 from a first transmission mode 48-1 (e.g., unicast transmission) to a second transmission mode 48-2 (e.g. broadcast transmission), the system controller 32 transmits a synchronization marker 312 to the receiver 34. The synchronization marker 312 indicates, to the receivers 34-1, 34-2, at least one transition point between the content 56 distributed using the first transmission mode 48-1 and the same content 56 distributed using the second transmission mode 48-2.

For example, during a transition period between receiving content 56 in a broadcast mode 48-2 and receiving content 56 in the one-to-one transmission mode 48-1, the receiver 34 receives content 56 in both the one-to-one mode 48-1 and the one-to-many transmission mode 48-2. In one embodiment, the receivers 34-1, 34-2 include a buffer, such as a memory, to store the content transmitted according to each transmission mode 48-1, 48-2.

The content 56 in each mode, in one embodiment, includes a synchronization marker 312 that indicates at least one transition point from the content 56 distributed in the one-to-many mode 48-2 to the same content distributed in one-to-one mode 48-1. For example, the synchronization marker 312 can include an inaudible number or value associated with the content 56. The synchronization marker 312 ensures alignment or synchronicity between the content 56 distributed in the one-to-many transmission mode 48-2 and the content distributed in one-to-one mode 48-1. By matching the synchronization markers 312 in the content 56 distributed in the one-to-many transmission mode 48-2 and the content distributed in the one-to-one transmission mode 48-1, the receiver 32 provides a transition or switchover from the content 56 received in the one-to-many mode 48-2 to the content 56 received in the one-to-one mode 48-1 that minimizes the creation of a switching artifact or a break in the continuity of the content 56 as presented by the receivers 34-1, 34-2 to the end users.

As described, the receivers 34-1, 34-2 receive content 56 as distributed through the content delivery system 20. The content 56 transmitted through the content distribution system 20 can be delivered either by a content source 30 or by the system controller 32.

In one embodiment, as illustrated in FIG. 5, both the content source 30-1 and the system controller 32 provide content in the system 20. In this embodiment, the content source 30-1 provides content in the one-to-one transmission mode 48-1 while the system controller 32 provides content in the one-to-many transmission mode 48-2. Such an arrangement is a single transmission arrangement. In this case, because there is a single transmitter (e.g., system controller 32), if a content source 30 malfunctions there is minimal or no danger of interfering one-to-many transmissions caused by the malfunction.

For example, for the content provider 30-1 to broadcast content 56 within the system 20, the content source 30-1 transmits a content distribution request 40 to the system controller 32. Based upon the content distribution characteristic 42 associated with the content distribution request 40 (e.g., whether or not the content 56 is popular within the system 20), the system controller 32 determines if the content 56 associated with the content distribution request 40 can be distributed in a one-to-many transmission mode 48-2.

In the case where the content 56 associated with the content source 30-1 can be transmitted by way of one-tomany transmission, such as broadcast, the system controller 32 notifies the content source 30-1 of the availability of a channel for distribution of the content 56 by broadcast. In one embodiment, the system controller 32 adds information related to the content 56 and the content source 30-1 to the allocation table 300. The system controller 32 notifies the content source 30-1 that the content 56 associated with the content source 30 can be distributed according to the one-to-many transmission mode 48-2 by transmitting the allocation table 300 to the content source 30-1. The content source 30-1 then provides a unicast stream of the content 56 to the system controller 32. In turn, the system controller 32 transmits the content 56 in the one-to-many transmission mode 48-2 to the receivers 34-1, 34-2 associated with the system 20.

In the case where the content 56 associated with the content source 30-1 cannot be transmitted by way of one-to-many transmission, the content source 30-1 transmits the content 56 within the system 20 using a one-to-one transmission mode 48-1. In one embodiment, the system controller 32 provides a notification to the content source 30-1 denying the content distribution request 40. In this arrangement, a receiver 34-1 interested in receiving content 56 from the content source 30-1, in the one-to-one transmission mode 48-1, connects directly to the content source 30-1 and receives the content 56 as a one-to-one transmission directly from the content source 30-1.

In another embodiment, as illustrated in FIG. 5, both the content source 30-1 and the system controller 32 provide content in the system 20. In this embodiment, however the content source 30-1 provides content 56 either in a one-to-one transmission mode 48-1 or a one-to-many transmission mode 48-2 while system controller 32 directs the content source 30-1 to distribute the content 56 either in the one-to-one 48-1 or one-to-many transmission mode 48-2. Such an arrangement is a multiple transmission arrangement.

For example, in this embodiment, the content source 30 transmits a content distribution request 40 to the system controller 32 regarding the transmission of content 56 either in a one-to-one transmission mode 48-1 or a one-to-many transmission mode 48-2. The system controller 32 detects the content distribution characteristic 42 associated with the content 56 to be distributed by the content source 30. Based upon the results of the detection step, the system controller 32 directs the content source 30-1 to transmit the content 56 in either the one-to-one transmission mode 48-1 or the one-to-many transmission mode 48-2. In this arrangement the content source does not transmit content 56 to the system controller 32 for further transmission. Each content source 30 transmits content 56 the receivers 34-1, 34-2 either by one-to-one transmission or one-to-many transmission.

In this embodiment, during a transition from a first transmission mode 48-1 to a second transmission mode 48-2, the system controller 32 transmits a notification to both the content source 30-1 and the receivers 34-1, 34-2. For example, system controller 32 transmits the allocation table 300 to the content source 30-1 and the receivers 34-1, 34-2 to indicate a transition between transmission modes of a particular type of content 56. In this arrangement, after receiving the allocation table 300, the content source 30-1 the content source reviews the information in the allocation table 300 and, based upon the change to an entry 326 in the table 300, switches from distribution of the content 56 in the first transmission mode 48-1 to the second transmission mode 48-2. Also in this arrangement, after receiving the allocation table 300, the receivers 34-1, 34-2 reviews the information in the allocation table 300 and, based upon the change to an entry 326 in the table 300, switches from receiving the content 56 in the first transmission mode 48-1 to the second transmission mode 48-2.

As described above, each content distribution system 20 includes a single system controller 32. However, in the case where the system controller 32 malfunctions, because there is no backup device to either broadcast content 56 or direct the distribution of content 56, content 56 ceases to be distributed within the system 20. In another embodiment of the invention, a content source 30 associated with the system 20 performs the functions of the system controller 32, thereby providing a fault tolerance within the system 20. In the case of failure of the system controller 32, a content source 30-1 of the plurality of content sources 30-1, 30-2 associated with the system 20 continues to provide system controller functions to the content delivery system 20.

The content sources 30-1, 30-2 use a protocol, such as an arbitration scheme, to select one content source 30 from the plurality of content sources 30 to act as the system controller 32 for the content distribution system 20. In one embodiment, the protocol is a peer-to-peer protocol such that no single content source 30 acts as a central hub or decision-making point in the process.

To start the arbitration process, at least one content source 30-1 detects the system controller 32 as failing to perform the system controller function (e.g., selecting a transmission mode for content 56 within the content distribution system 20). In one embodiment, the content source 30-1 detects the failure when, after the content source 30 transmits a content distribution request 40 to the system controller 32, the content source 30-1 fails to receive a response (e.g., allocation table 300) from the system controller 32 after a given time period.

After detection of system controller failure, the content sources 30-1, 30-2 perform a method for selecting a system controller 32, from the plurality of content sources 30-1, 30-2, for the content distribution system 20. The content sources 30-1, 30-2 detect an identifier characteristic 54, such as an Ethernet MAC address, associated with each of the plurality of content sources 30-1, 30-2.

For example, as shown in FIG. 5, the first content source 30-1 includes a first identifier characteristic 54-1 and the second content source 30-2 includes a second identifier characteristic 54-2. In one embodiment, when detecting the identifier characteristic 54, a first content source 30-1 broadcasts the first identifier characteristic 54-1 (e.g., a "reset" message along with the globally unique identifier (GUID) of the first content source 30-1) within the content distribution system 20 over the allocation table channel 70. In one embodiment, the first content source 30-1 transmits the reset message using an Ethernet discipline (e.g. Carrier Sense Multiple Access/Collision Detection (CSMA/CD) with binary exponential backoff).

Next, based upon the identifier characteristic, the content sources 30 select one content source 30 from the plurality of content sources 30 in the content distribution system 20 as the system controller 34 for the system 20. In one embodiment, when engaging in the selection process, the second content source 30-2 receiving the first identifier characteristic 54-1, in turn, transmits a second identifier characteristic 54-2 in response to the first identifier characteristic 54-1. When each content source 30-1, 30-2 compares each received identifier characteristic 54 with its own identifier characteristic 54, each content source 30 detects the content source 30 having the highest ranked identifier characteristic 54 or the lowest ranked identifier characteristic 54. In one embodiment, the content source 30 having the lowest ranked identifier characteristic (e.g., lowest value GUID) becomes the system controller 32 for the system 20 and performs the system controller functions.

For example, during the selection process, if the second content source 30-2 had received an allocation map 300 from the system controller 32 within a given time period, the second content source 30-2 transmits a negative acknowledgement code (NAK) to the first content source 30-1 to indicate that the first identifier characteristic 54-1 was received with errors. Transmission of the NAK indicates to the first content source 30-1 that the system controller 32 is not malfunctioning. In that case, the first content source 30-1 determines that some portion of the first content source 30-1 is malfunctioning and turns itself to an "off" mode of operation.

If the second content source 30-2 had not received an allocation map 300 from the system controller 32 within a given time period, the second content source 30-2 examines the GUID associated with the first identifier characteristic 54-1. If the GUID associated with the first identifier characteristic 54-1 is lower in value than the GUID associated with the second content source 30-2, the second content source 30-2 transmits a second identifier characteristic 54-2 containing an acknowledgement (ACK) to the first content source 30-1. By receiving the ACK, the first content source 30-1 declares itself the system controller 32. If the GUID associated with the first identifier characteristic 54-1 is higher in value than the GUID associated with the second content source 30-2, the second content source 30-2 transmits a second identifier characteristic 54-2 containing a reset message to the first content source 30-1. By receiving the reset message, the first content source 30-1 does not declare itself the system controller 32. The process continues until a single content source 30 having the lowest GUID value declares itself the system controller 32.

In summary, a content source, such as the first content source 30-1, that initiates the reset process (e.g., transmits a first identifier characteristic 54-1) and does not receive a NAK, ACK, or reset in response (e.g., a second identifier characteristic 54-2) in a leader-response protocol, assumes it is damaged and shuts itself off. A content source, such as the first content source 30-1, that initiates the reset process (e.g., transmits a first identifier characteristic 54-1) and does not receive a NAK or lowered-numbered GUID associated with a response reset message (e.g., a second identifier characteristic 54-2) declares itself the system controller 32.

As described, the system controller 32 and the content sources 30 associated with the system 20 affect the transmission of content 56 within the system 20 such that the content is transmitted either in the first transmission mode 40-1 or the second transmission mode 40-2. The content receiver 54 is configured to receive content 56 transmitted either according to the first transmission mode 40-1 or the second transmission mode 40-2.

Figure 6:
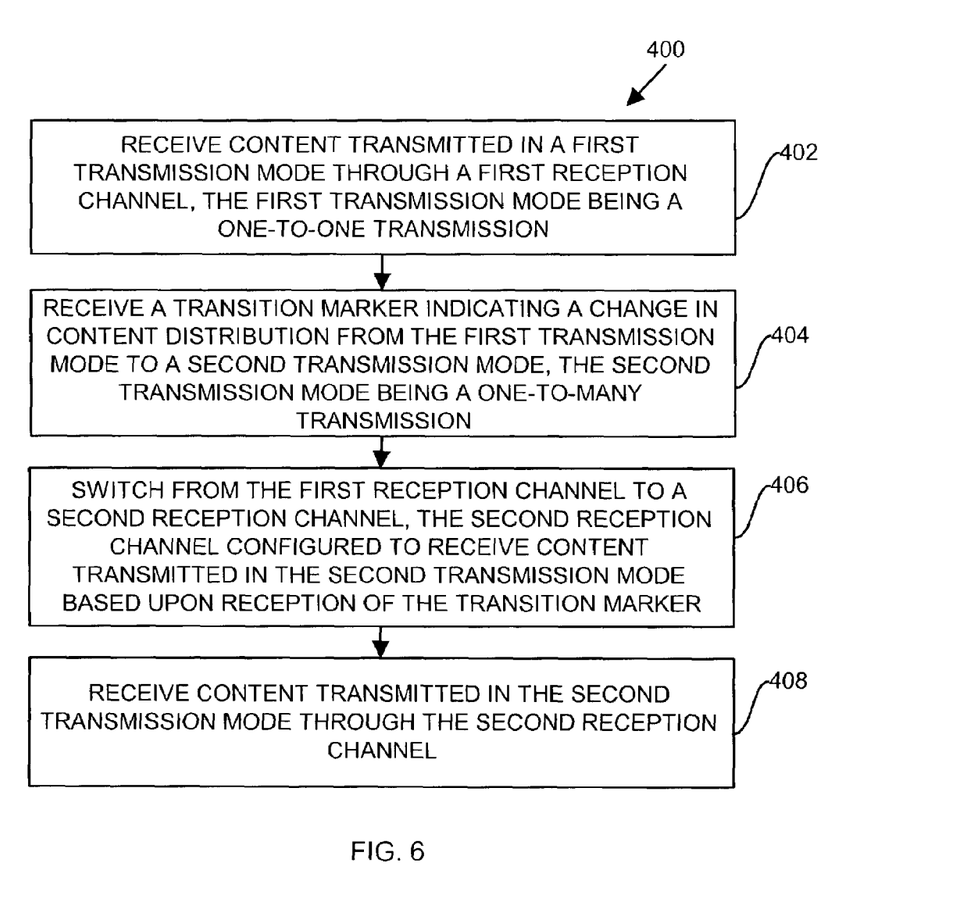
FIG. 6 is a flowchart of a procedure performed by the receiver of FIG. 1, according to one embodiment of the invention.

FIG. 6 illustrates a flowchart showing a method 400 performed by a receiver 34 in the system 20, according to one embodiment of the invention. The method allows a receiver 34 associated with the system 20 to receive content distributed either in the first transmission mode 40-1 or the second transmission mode 40-2.

In step 402, the receiver 34 receives content transmitted in a first transmission mode 40-1 through a first reception channel, the first transmission mode being a one-to-one transmission mode. For example, the receiver 34 receives content 56 as a unicast transmission.

In step 404, the receiver 34 receives a transition marker 310 indicating a change in content distribution mode from the first transmission mode 48-1 to a second transmission mode 48-2, the second transmission mode being a one-to-many transmission. In one embodiment, the receiver 34 receives the allocation table 300 from the system controller 32 having a transition marker 310. As described above, the transition marker 310 indicates the transition of content transmission from a first transmission mode 48-1 (e.g., unicast transmission) to content provided in a second transmission mode (e.g., broadcast or multicast transmission).

In step 406, the receiver 34 switches from the first reception channel to a second reception channel, the second reception channel configured to receive content transmitted in the second transmission mode 48-2, based upon reception of the transition marker 310. For example, during the switching process, the receiver 34 engages a mechanism that deactivates a first transmission mode 48-1 reception channel and activates a second transmission mode 48-1 reception channel.

In step 408, the receiver 34 receives content 56 transmitted in the second transmission mode 48-2 through the second reception channel. For example, the receiver 34 receives content 56 as a broadcast transmission.

Figure 7:
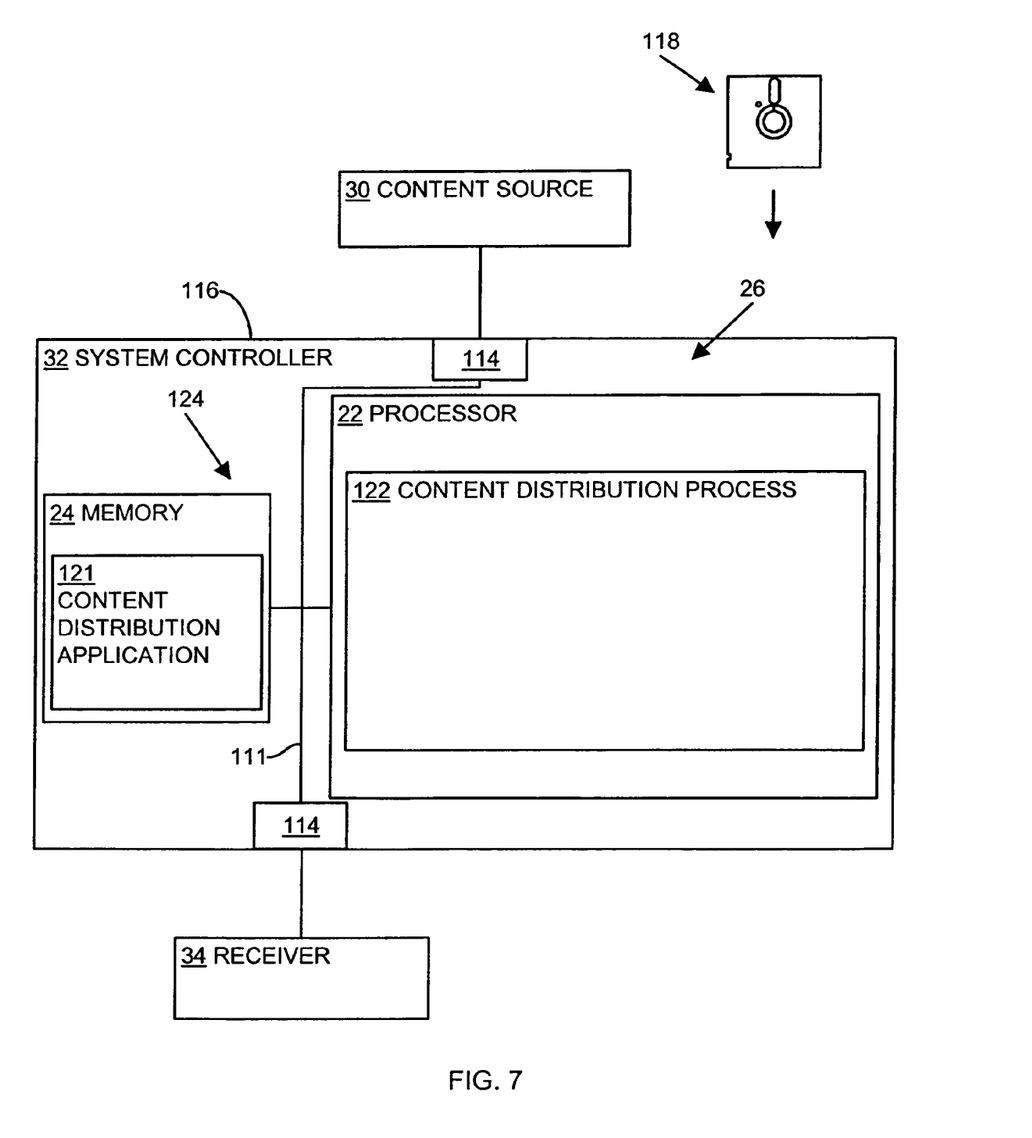
FIG. 7 is a block diagram of a block diagram of a computerized device, configured according to one embodiment of the invention.

FIG. 7 illustrates a more detailed architecture of a system controller 32 configured as a computerized device 116 according to one embodiment of the invention. A computer program product 118 includes an application or logic instructions, such as content distribution instructions, that are loaded into the computerized device 32 to configure the computerized device 32 to monitor the configuration state of the system 20.

The system controller 32 in this embodiment of the invention includes an interconnection mechanism 111 such as a data bus and/or other circuitry that interconnects a controller 124, including a memory 24 and a processor 22, and one or more communications interfaces 114.

The memory 24 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 24 is encoded with logic instructions (e.g., software code) and/or data that form a content distribution application 121 configured according to embodiments of the invention. In other words, the content distribution application 121 represents software code, instructions and/or data that represent or convey the processing logic steps and operations as explained herein and that reside within memory or storage or within any computer readable medium accessible to the system controller 32.

The processor 21 represents any type of circuitry or processing device such as a central processing unit, microprocessor or application-specific integrated circuit that can access the content distribution application 121 encoded within the memory 24 over the interconnection mechanism 111 in order to execute, run, interpret, operate or otherwise perform the content distribution application 121 logic instructions. Doing so forms the content distribution process 122. In other words, the content distribution process 122 represents one or more portions of the logic instructions of the content distribution application 121 while being executed or otherwise performed on, by, or in the processor 22 within the system controller 32.

Those skilled in the art will understand that there can be many variations made to the embodiments explained above while still achieving the same objective of those embodiments and the invention in general.

As described above, the system controller 32 is described as operating as a computerized device or as performing computer logic steps. In another embodiment, both the content source 30 and the receiver 34 are configured to operate as a computerized device and perform the computer logic steps described above.

In one embodiment, the content source 30 comprises at least one communications interface (e.g., a network interface), a controller having a memory (e.g., any type of computer readable medium, storage or memory system) and a processor, and an interconnection mechanism connecting the communications interface, the processor and the memory. In such embodiments, the memory system is encoded with a content source application that when performed on the processor, produces a content source process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a content source application, such as a content source operating system configured with a content source manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

In another embodiment, the receiver 34 comprises at least one communications interface (e.g., a network interface), a controller having a memory (e.g., any type of computer readable medium, storage or memory system) and a processor, and an interconnection mechanism connecting the communications interface, the processor and the memory. In such embodiments, the memory system is encoded with a receiver application that when performed on the processor, produces a receiver process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a receiver application, such as a receiver operating system configured with a receiver manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

Such variations are intended to be covered by the scope of this invention. As such, the foregoing description of embodiments of the invention is not intended to be limiting. Rather, any limitations to the invention are presented in the following claims.

What is claimed is:

1. In a system controller for a content distribution system, a method for selecting a content distribution mode comprising the steps of:

receiving a content distribution request from a content source;

detecting, in response to receiving the content distribution request, a content distribution characteristic for content to be distributed by the content source; and selecting a transmission mode, from one of a first transmission mode and a second transmission mode, for distributing the content within the content distribution system based upon the content distribution characteristic, the first transmission mode being a one-to-one transmission and the second transmission mode being a one-to-many transmission, detecting comprises detecting, in response to receiving the content distribution request, the content distribution characteristic for content to be distributed by the content source, the content distribution characteristic indicating a number of receivers that request the content over a period of time, in response to detecting, comparing the content distribution characteristic with a threshold limit, and selecting comprises selecting a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit; and further comprising the step of transmitting a transition marker to at least one receiver associated with the content distribution system, the transition marker indicating a switching of content distribution between the first transmission mode and the second transmission mode.

2. The method of claim 1 further comprising the step of transmitting a synchronization marker to the at least one receiver, the synchronization marker indicating, to the at least one receiver, at least one transition point between the content distributed using the first transmission mode and the content distributed using the second transmission mode, thereby minimizing creation of a switching artifact.

3. The method of claim 1 wherein the step of detecting comprises the steps of:
receiving a content reception characteristic related to the content distributed in the content distribution system, the content reception characteristic indicating reception of the content by at least one content receiver, and
comparing the content reception characteristic with a threshold condition; and
wherein the step of selecting comprises the step of:
selecting a transmission mode for the content based upon a result of the comparison of the content reception characteristic and the threshold condition.

4. The method of claim 1 further comprising the step of directing at least one content source associated with the content distribution system to transmit the content using the selected transmission mode for the content.

5. A device associated with a content distribution system comprising:
at least one communications interface;
a controller; and
an interconnection mechanism coupling the at least one communications interface and the controller;
wherein the controller is configured to:
receive a content distribution request from a content source through the interface;
detect, in response to receiving the content distribution request, a content distribution characteristic for content to be distributed by the content source through the interface; and
select a transmission mode, from one of a first transmission mode and a second transmission mode, for distributing the content within the content distribution system based upon the content distribution characteristic, the first transmission mode being a one-to-one transmission and the second transmission mode being a one-to-many transmission,
when detecting, detect, in response to receiving the content distribution request, the content distribution characteristic for content to be distributed by the content source, the content distribution characteristic indicating a number of receivers that request the content over a period of time,
in response to detecting, compare the content distribution characteristic with a threshold limit, and
when selecting, select a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit; and
wherein the controller is configured to transmit a transition marker to at least one receiver associated with the content distribution system, the transition marker indicating a switching of content distribution between the first transmission mode and the second transmission mode.

6. The device of claim 5 wherein the controller is configured to transmit a synchronization marker to the at least one receiver, the synchronization marker indicating, to the at least one receiver, at least one transition point between the content distributed using the first transmission mode and the content distributed using the second transmission mode, thereby minimizing creation of a switching artifact.

7. The device of claim 5 wherein the controller, while detecting, is configured to:
receive a content reception characteristic related to the content distributed in the content distribution system, the content reception characteristic indicating reception of the content by at least one content receiver, and
compare the content reception characteristic with a threshold condition; and
wherein the computerized device, while selecting, is configured to:
select a transmission mode for the content based upon a result of the comparison of the content reception characteristic and the threshold condition.

8. The device of claim 5 wherein the controller is configured to direct at least one content source associated with the content distribution system to transmit the content using the selected transmission mode for the content.

9. A computer program product having a computer-readable medium including computer program logic encoded thereon that, when performed on a controller in a computerized device having a coupling to at least one communications interface provides a method for performing the operations of:
receiving a content distribution request from a content source;
detecting, in response to receiving the content distribution request, a content distribution characteristic for content to be distributed by the content source; and
selecting a transmission mode, from one of a first transmission mode and a second transmission mode, for the content within the content distribution system based upon the content distribution characteristic, the first transmission mode being a one-to-one transmission and the second transmission mode being a one-to-many transmission,
detecting comprises detecting, in response to receiving the content distribution request, the content distribution characteristic for content to be distributed by the content source, the content distribution characteristic indicating a number of receivers that request the content over a period of time,
in response to detecting, comparing the content distribution characteristic with a threshold limit, and
selecting comprises selecting a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit; and
transmitting a transition marker to at least one receiver associated with the content distribution system, the transition marker indicating a switching of content distribution between the first transmission mode and the second transmission mode.

10. A computerized device comprising:
at least one communications interface;
a controller; and
an interconnection mechanism coupling the at least one communications interface and the controller;

wherein the computerized device is configured to produce a means for distributing content, such means including:

means for receiving a content distribution request from a content source;

means for detecting, in response to receiving the content distribution request, a content distribution characteristic for content to be distributed by the content source; and means for selecting a transmission mode, from one of a first transmission mode and a second transmission mode, for the content within the content distribution system based upon the content distribution characteristic, the first transmission mode being a one-to-one transmission and the second transmission mode being a one-to-many transmission, means for detecting comprises means for detecting, in response to receiving the content distribution request, the content distribution characteristic for content to be distributed by the content source, the content distribution characteristic indicating a number of receivers that request the content over a period of time, in response to detecting, comparing the content distribution characteristic with a threshold limit, and means for selecting comprises means for selecting a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit; and means for transmitting a transition marker to at least one receiver associated with the content distribution system, the transition marker indicating a switching of content distribution between the first transmission mode and the second transmission mode.

11. In a plurality of content sources associated with a content distribution system, a method for selecting a system controller for the content distribution system comprising the steps of:

detecting an identifier characteristic associated with each of the plurality of content sources; and selecting one content source from the plurality of content sources as the system controller within the content distribution system based upon the identifier characteristic, the system controller configured to:

receive a content distribution request from a content source, detect, in response to receiving the content distribution request, a content distribution characteristic for content to be distributed by the content source, and select a transmission mode, from one of a first transmission mode and a second transmission mode, for the content within the content distribution system based upon the content distribution characteristic, the first transmission mode being a one-to-one transmission and the second transmission mode being a one-to-many transmission, the system controller, when detecting, is configured to detect, in response to receiving the content distribution request, the content distribution characteristic for content to be distributed by the content source, the content distribution characteristic indicating a number of receivers that request the content over a period of time, in response to detecting, the system controller is configured to compare the content distribution characteristic with a threshold limit, and the system controller, when selecting, is configured to select a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit, and transmit a transition marker to at least one receiver associated with the content distribution system, the transition marker indicating a switching of content distribution between the first transmission mode and the second transmission mode.

12. A device associated with a content distribution system comprising:

at least one communications interface;

a controller; and an interconnection mechanism coupling the at least one communications interface and the controller;

wherein the controller is configured to:

detect an identifier characteristic associated with each of the plurality of content sources; and select one content source from the plurality of content sources as the system controller within the content distribution system based upon the identifier characteristic, the system controller configured to:

receive a content distribution request from a content source, detect, in response to receiving the content distribution request, a content distribution characteristic for content to be distributed by the content source, and select a transmission mode, from one of a first transmission mode and a second transmission mode, for the content within the content distribution system based upon the content distribution characteristic, the first transmission mode being a one-to-one transmission and the second transmission mode being a one-to-many transmission, when detecting, detect, in response to receiving the content distribution request, the content distribution characteristic for content to be distributed by the content source, the content distribution characteristic indicating a number of receivers that request the content over a period of time, in response to detecting, compare the content distribution characteristic with a threshold limit, and when selecting, select a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit, and transmit a transition marker to at least one receiver associated with the content distribution system, the transition marker indicating a switching of content distribution between the first transmission mode and the second transmission mode.

13. A computer program product having a computer-readable medium including computer program logic encoded thereon that, when performed on a controller in a computerized device having a coupling to at least one communications interface provides a method for performing the operations of:

detecting an identifier characteristic associated with each of the plurality of content sources; and selecting one content source from the plurality of content sources as the system controller within the content distribution system based upon the identifier characteristic, the system controller configured to:

receive a content distribution request from a content source, detect, in response to receiving the content distribution request, a content distribution characteristic for content to be distributed by the content source, and select a transmission mode, from one of a first transmission mode and a second transmission mode, for the content within the content distribution system based upon the content distribution characteristic, the first transmission mode being a one-to-one transmission and the second transmission mode being a one-to-many transmission, when detecting, detect, in response to receiving the content distribution request, the content distribution characteristic for content to be distributed by the content source, the content distribution characteristic indicating a number of receivers that request the content over a period of time, in response to detecting, compare the content distribution characteristic with a threshold limit, and when selecting, select a one-to-many transmission mode for distributing the content within the content distribution system when the content distribution characteristic satisfies the threshold limit and selecting a one-to-one transmission mode for distributing the content within the content distribution system when the content distribution characteristic does not satisfy the threshold limit, and transmit a transition marker to at least one receiver associated with the content distribution system, the transition marker indicating a switching of content distribution between the first transmission mode and the second transmission mode.

14. The method of claim 1 wherein selecting comprises selecting the one-to-many transmission mode for distributing the content within the content distribution system when the content distribution characteristic is greater than the threshold limit and selecting the one-to-one transmission mode for distributing the content within the content distribution system when the content distribution characteristic is less than the threshold limit.

15. The method of claim 11 wherein the system controller, when selecting is configured to select the one-to-many transmission mode for distributing the content within the content distribution system when the content distribution characteristic is greater than the threshold limit and select the one-to-one transmission mode for distributing the content within the content distribution system when the content distribution characteristic is less than the threshold limit.

16. The method of claim 1, wherein transmitting further comprises:

transmitting an allocation table to the at least one receiver associated with the content distribution system, the allocation table having a channel field indicating the number of channels available for distribution of content within the content distribution system, a use field indicating an operation state of a channel in the channel field, and a marker field, the marker field having the transition marker.

17. The method of claim 16, wherein transmitting the allocation table comprises transmitting the allocation table to the at least one receiver associated with the content distribution system via an allocation table channel, the allocation table channel being distinct from a content delivery channel used for distributing the content within the content distribution system.

18. The method of claim 1, wherein transmitting the transition marker to at least one receiver associated comprises transmitting, to the at least one receiver associated with the content distribution system, a starting marker indicating termination of the transmission of content being transmitted in the one-to-one transmission mode.

19. The method of claim 1, wherein transmitting the transition marker to at least one receiver associated comprises transmitting, to the at least one receiver associated with the content distribution system, a stopping marker indicating termination of the transmission of content being transmitted in the one-to-many transmission mode.

* * * * *